INVENTOR
Harold N. Ipsen
by Wolfe, Hubbard, Voit & Osann
ATTORNEY

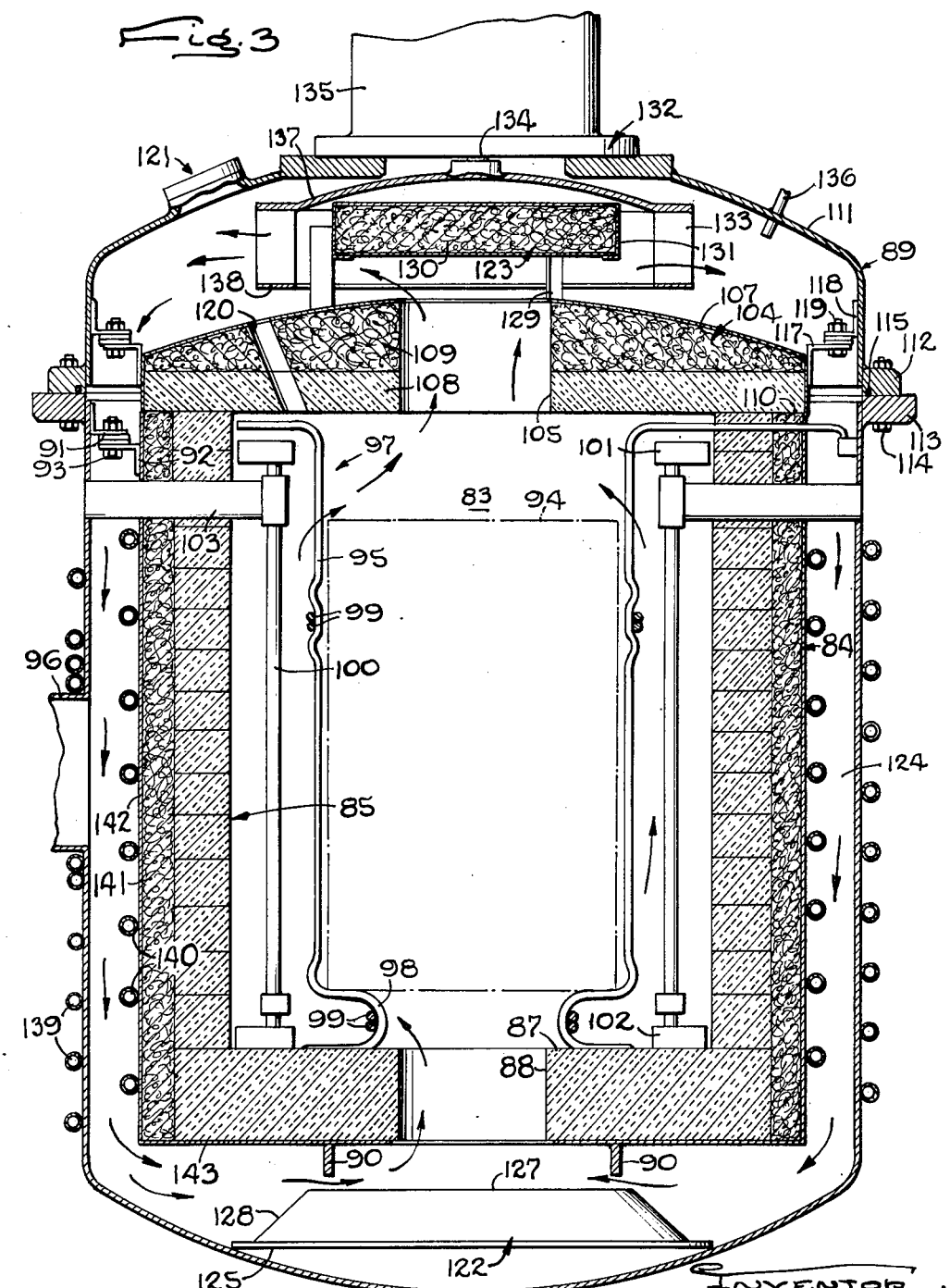

3,219,331
HEAT TREATING FURNACE
Harold N. Ipsen, Rockford, Ill.; The Illinois National Bank & Trust Co., Rockford, Ill., executor of said Harold N. Ipsen, deceased
Filed Dec. 18, 1961, Ser. No. 159,981
10 Claims. (Cl. 266—5)

This invention relates to heat treating furnaces and, more particularly, to furnaces of the type in which workpieces to be treated are heated in a work chamber in an evacuated vessel and subsequently quenched in a cooling gas circulated into and out of the work chamber and cooled as it passes through the vessel outside the work chamber.

The general object of the present invention is to provide a new and improved furnace of the foregoing character that is more effective in operation than prior furnaces for the same general purpose, and is easier to maintain in service use.

A more specific object is to provide a practical and more effective vacuum heating-atmosphere quench furnace by insulating the walls of the work chamber and thereby eliminating the need for complex and difficult-to-maintain radiation shielding.

Another object is to provide more uniform and efficient heating and more rapid quenching than has been obtained heretofore.

A further object is to reduce the amount of stored heat in the walls of the enclosure thereby to facilitate rapid cooling of both the work and the gas.

Still another object is to maintain the outer portion of the enclosure walls at relatively low temperatures so that this portion of the walls may be composed of comparatively inexpensive insulating material resistant to substantially lower temperatures than those attained in the work chamber.

A related object is to maintain the enclosure walls at lower temperatures thereby to increase the efficiency of the insulation in the walls and permit the use of thinner layers of such insulation.

Other objects and advantages of the invention will become apparent from the following detailed description taken in connection with the accompanying drawings, in which FIGURE 1 is a fragmentary vertical sectional view taken longitudinally of a furnace embodying the novel features of the present invention, the section being taken along the line 1—1 of FIG. 2.

FIG. 3 is a fragmentary vertical sectional view of a modified form of the furnace shown in FIGS. 1 and 2.

Figure 1:
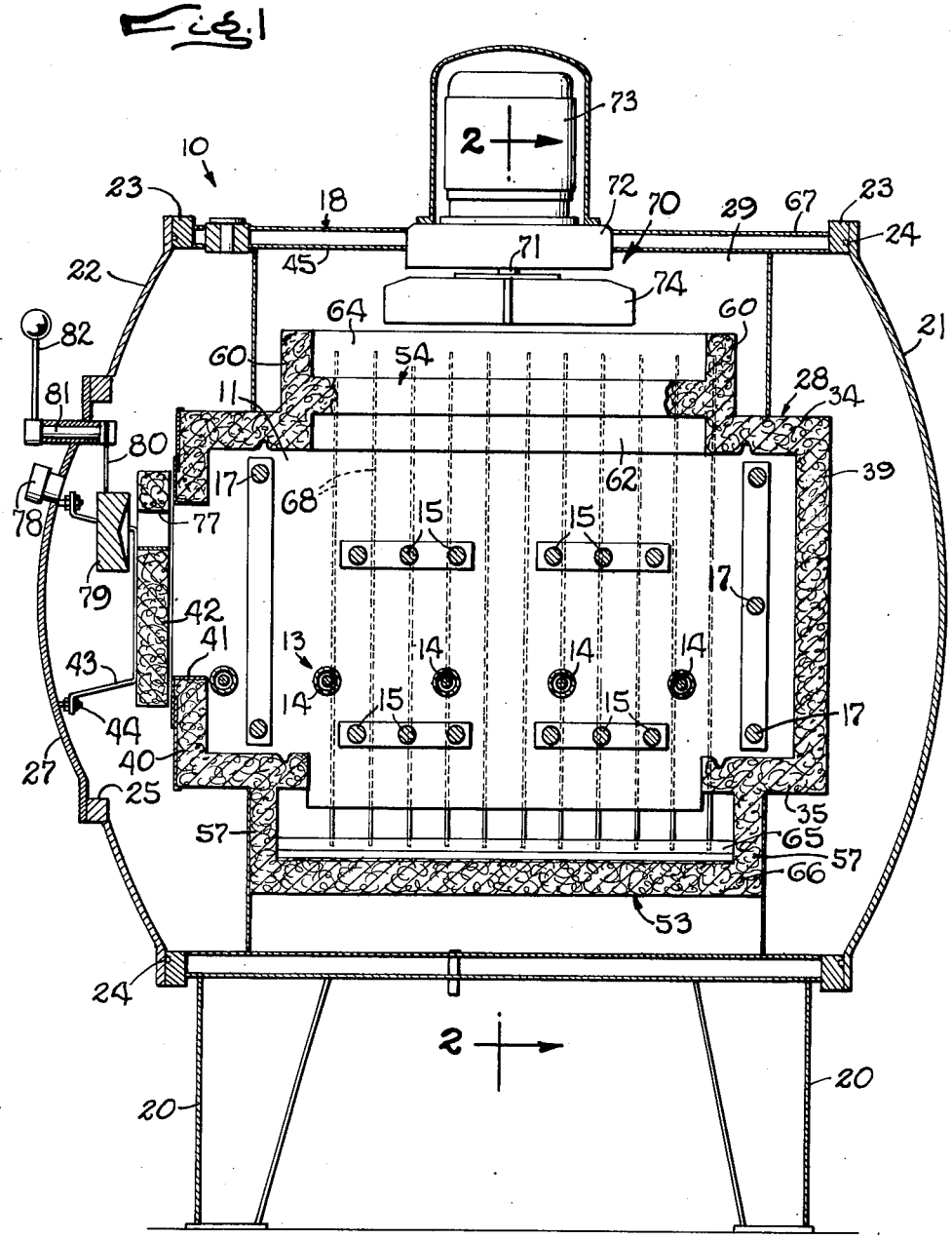

As shown in the drawings for purposes of illustration, the invention is embodied in a heat treating furnace 10 in which workpieces to be treated are heated in a work chamber 11 and subsequently quenched in a cooling gas to obtain improved physical properties of the metal of the workpieces. During treatment, the workpieces may be held in trays or baskets 12 which are supported in the chamber on a platform 13 formed by a plurality of horizontal rollers 14 spanning the chamber and journaled at opposite ends in the walls thereof. The work is heated by conventional selectively operable radiant heaters such as electric heating tubes 15 extending horizontally across the chamber 11 above and below the platform. Additional tubes 17 may be mounted adjacent the ends of the chamber.

To prevent oxidation of the workpieces during heating, the furnace is enclosed by a hollow, air-tight vessel 18 which is evacuated prior to heating by evacuating means well known in the art. For example, the vessel may be formed with an outlet port 19 communicating with a selectively operable vacuum pump (not shown) which may be of the type disclosed in my copending application Serial No. 125,554, now Patent No. 3,144,199. In the form shown in FIGS. 1 and 2, the vessel 18 comprises a generally cylindrical shell supported in a horizontal position on spaced vertical legs 20 secured to the underside of the vessel adjacent the ends thereof. The ends of the vessel are closed by covers 21 and 22 (FIG. 1), each of these covers comprising a dished annular plate bolted around its periphery to a ring 23 encircling the end of the shell. O rings 24 may be pressed between the rings 23 and the covers 21 and 22 to prevent air leakage into the vessel. The cover 22 is formed with an opening 25 alined with the platform 13 for loading and unloading the baskets. A removable outer door 27 is provided to seal the opening 25 during operation of the furnace.

The workpieces may be both heated and quenched in the work chamber 11 quickly, effectively, and without being moved. For this purpose, the workpieces are heated in the work chamber while the latter is evacuated and, upon completion of the heating cycle, a non-oxidizing gas is admitted into the interior of the vessel and circulated first across cooling means in the vessel shielded from the heaters and then into the work chamber and across the workpieces to cool the latter.

The chamber 11 is defined by a walled enclosure 28 supported in the vessel in spaced relation with the walls thereof so than an outer chamber 29 is formed in the vessel outside the enclosure, the cooling means being disposed in this outer chamber and thus shielded from heat radiated by the heaters 15 and 17 within the work chamber. Formed in the walls of the enclosure are inlet and outlet openings 30 and 31 respectively, each communicating between the inner and outer chambers through circuitous passages 32 and 33 which permit gas circulation in and out of the work chamber while preventing heat rays from passing through the passages along rectilinear paths. Means is provided for admitting the non-oxidizing gas into the interior of the vessel upon completion of the heating cycle and circulating the gas across the cooling means in the outer chamber, through the inlet opening into the work chamber and across the workpieces, and then back to the outer chamber through the outlet opening for re-cooling and re-circulation through the work chamber.

In the present instance, the enclosure 28 (FIGS. 1 and 2) is formed by a box-like structure including top and bottom walls 34 and 35, upright side walls 37 and 38 in which the ends of the rollers 14 are journaled, and end walls 39 and 40. In the end 40 adjacent the cover 22 is an opening 41 for receiving the baskets, the opening being alined with the outer door 27 and having a lower edge level with the platform 13. A door 42 for closing this opening may be carried on the outer door 27 on U-shaped bars 43 which are bolted at 44 to the outer door and suitably secured to the outer side of the inner door to position the latter over the opening 41 when the vessel is sealed closed.

To suport the enclosure in the vessel in spaced relation with the inner wall 45 of the latter, two horizontal tracks 47 formed by elongated angle bars 48 extending axially along opposite sides of the interior of the vessel are supported on spaced brackets 49 (FIG. 2) mounted on the inner wall 45 and extending inwardly therefrom. Wheels 50 journaled on stubshafts 51 projecting outwardly from the enclosure side walls are disposed above and rest on the tracks. Thus, the enclosure is supported in the vessel on the tracks and may be moved in and out through an open end of the vessel, the wheels 50 rolling along the tracks to facilitate insertion and removal of the enclosure.

Preferably, the inlet and outlet openings 30 and 31 are formed in opposite walls of the enclosure 28 so that the workpieces in the center of the chamber 11 lie directly in the path of the cooling gas. Further, with such an arrangement, the heated gas flowing out of the work chamber is subjected to optimum exposure to the cooling means in circulating through the outer chamber between the outlet and the inlet. For these purposes, the inlet is formed in the bottom wall 35 of the enclosure and the outlet in the top wall 34 with the cooling means disposed in the outer chamber on both sides of the enclosure.

Figure 2:
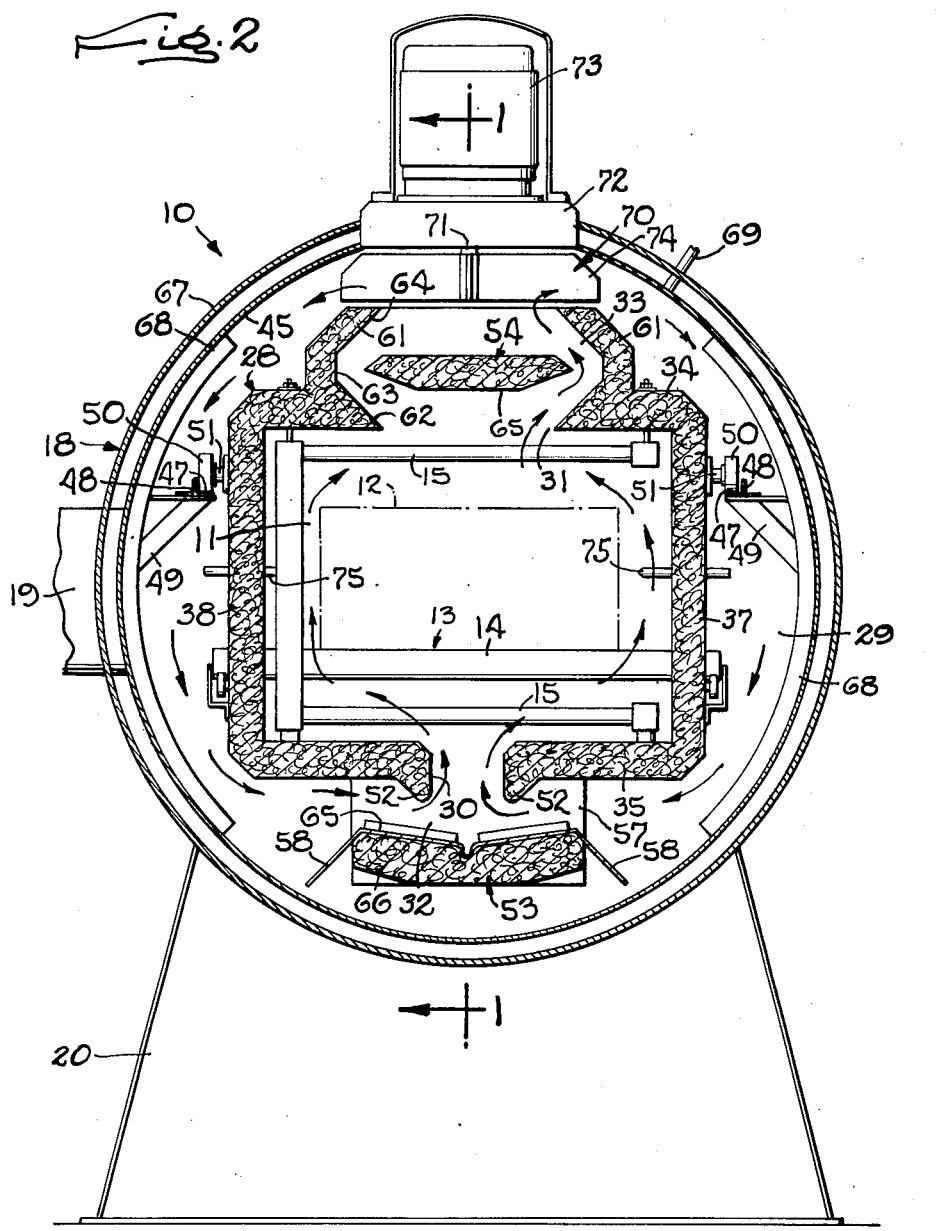
FIG. 2 is a fragmentary sectional view taken along the line 2—2 of FIG. 1.

As shown most clearly in FIG. 2, the inlet opening 30 is formed in this instance by an elongated slot centered on the bottom 35 between the side walls 37 and 38 and extending axially of the vessel along substantially the entire length of the enclosure. Lips 52 may be formed along the edges of the opening to extend downwardly therefrom, increasing the thickness of the bottom wall adjacent the opening and, therefore, decreasing the included angle of radiation through the opening. The outlet opening 31 is centered on the top wall 34 and also comprises an elongated slot extending along substantially the entire length of the enclosure.

While the circuitous passages 32 and 33 into the outer chamber 29 may be formed in various ways, preferably this is accomplished by mounting baffle members 53 and 54 across the openings 30 and 31 in spaced relation with the adjacent walls of the enclosure, each member being larger than the associated opening and overlying the opening to overlap the wall on each side of the opening. Thus, the baffles are disposed in the path of radiation directed toward the openings during the heating cycle while defining, in cooperation with the adjacent walls, the indirect passages through which the gas may flow during quenching.

Herein, the inlet baffle 53 includes an elongated panel suspended in the outer chamber below the opening 30 on two legs 57 depending from the bottom wall at opposite ends of the opening with the baffle extending between and fastened to the lower ends of the legs. The panel is made wider than the opening to extend beyond each side thereof far enough to block all heat rays passing through the opening. Elongated deflector plates 58 may be mounted on the sides of the baffle and inclined downwardly and outwardly therefrom to direct the flow of cooled gas above the baffle and toward the inlet opening as indicated by the arrows in FIG. 2.

Similarly, the outlet baffle 54 includes an elongated panel supported outside the work chamber, that is, above the opening 31, and wider than the opening to overlap the edges of the top wall 34 along each side of the opening. This baffle may be supported on vertical walls 60 upstanding from the outer side of the top wall at each end of the opening as shown in FIG. 1. In this instance, upright side walls 61 on each side of the outlet baffle extend above the baffle as shown in FIG. 2. The inner surfaces of these walls initially diverge upwardly at 62 to lines level with the baffle, are parallel and vertical at 63 along the sides of the baffle, and then converge at 64 beyond the baffle until they are more closely spaced than the width of the baffle. The latter is suspended in the passage enlargement thus formed, intermediate the ends of the end walls 60. Thus, the baffle blocks most of the heat radiated through the opening and the heat that passes through the opening without striking the baffle is blocked by the converging walls 64.

With the foregoing arrangement, the openings through the enclosure walls form part of the passages 32 and 33 and each baffle forms two branch passages communicating with and extending transversely of the axis of the associated opening, the branches leading around opposite sides of the baffle and communicating with the outer chamber.

It will be evident that the walls of the enclosure 28 and the baffles, while blocking direct radiation from the work chamber 11, will be heated by the radiation, conduct the heat to their outer surfaces, and thus become sources of radiant heat tending to heat the outer chamber and the walls of the vessel. This tendency may be counteracted and such heating reduced in various ways. For example, the inner surfaces of the enclosure walls and the baffle surfaces facing toward the chamber 11 may be made reflective to direct most of the radiant heat back toward the work while absorbing relatively little. Herein, the baffles and the enclosure walls in the furnace shown in FIGS. 1 and 2 are formed by shells comprising spaced panels 65 of heat resistant metal, preferably stainless steel or molybdenum, and, in accordance with the present invention, the spaces 66 within the shells are filled with an insulating material such as that known as alumina wool. Thus, part of the heat is reflected and the insulation reduces conduction of the absorbed heat to the outer surfaces. To direct most of the reflected heat back into the openings rather than against the outer walls of the enclosure, the reflecting surfaces of the baffles may be made V-shaped as shown on the inlet baffle in FIG. 2 with the V opening toward the workpieces.

In order to cool the gas in the outer chamber, the vessel 18 herein comprises concentric inner and outer cylindrical walls 45 and 67 spaced apart to form a jacket providing a passage in which cold fluid such as water from a suitable source (not shown) is circulated to cool the inner wall 45 in contact with the circulating gas. The walls 45 and 67 are held in spaced relation by the rings 23 at the ends of the vessel. Thus, the means for cooling the gas in the outer chamber includes the water-cooled inner wall 45. To increase the water-cooled surface area in contact with the gas, additional elements comprising a series of arcuate fins 68 may be fastened to and spaced apart along the inner wall 45 on each side of the enclosure.

When the workpieces in the evacuated furnace chamber have been heated to the critical temperature, the heating tubes are de-energized and the cooling gas is admitted into the vessel through a conduit 69 connected to a suitable source (not shown) such as a storage tank or a gas generator. Herein, the gas is circulated by means comprising a fan 70 mounted in the outer chamber 29 and preferably above the outlet opening to force gas from the vicinity of the opening outwardly and downwardly along the inner wall of the vessel on both sides of the enclosure. The fan shaft 71 extends through and is journaled in a pad 72 set in the vessel walls above the enclosure, and is driven by an electric motor 73 bolted to the pad 72 outside the vessel. Mounted on the inner end of the shaft to rotate in a plane extending across the outer end of the outlet passage 33 are a plurality of radial blades 74 angularly spaced around the shaft. Thus, when the fan is driven, the blades draw gas from within the work chamber 11 through the outlet and around the baffle 54, and force the gas outwardly on both sides of the enclosure along the cooling elements and toward the inlet passage. Because of the reduced pressure within the chamber 11, cooled gas is drawn into the latter over the baffle 53 and through the inlet opening, and flows around the workpieces and back to the outlet for recirculation through the outer chamber.

In some applications, sufficient gas circulation may be obtained by means of a chimney effect creating a draft within the furnace without the use of a fan. Thus, heated gas flows out through the outlet passage and into contact with the cooling means, and cool gas flows in through the inlet passage and is heated while cooling the workpieces.

Changes in the furnace temperature during operation may be sensed by thermocouples 75 projected into the work chamber through the side walls thereof and operable to produce signals which may be utilized to control the furnace operation. Also, a sight passage 77 is formed in the inner door 42 in alinement with a glass-covered sight opening 78 in the outer door 27 to permit visual observation of the work during heating. Preferably, a shield 79 is positioned over the sight passage 77 to block radiation therethrough and is mounted on a rod 80 fast at one end on a pin 81 journaled on the door 27 and projecting through the latter. The shield may be swung into and out of its blocking position by a manually operable lever 82 fastened to the outer end of the pin.

When operating with temperatures in the low temperature range, that is, with temperatures between 300° F. and 2250° F., the metal shell and alumina wool wall structure illustrated in FIGS. 1 and 2 may be used. For higher temperature operation, however, it is desirable to use a furnace of the type shown in FIG. 3 in which the inner portion of the enclosure walls defining the work chamber 83 are composed of insulating material such as refractory brick capable of withstanding a predetermined and relatively high temperature and vacuum.

In this instance, the enclosure 84 includes a cylindrical brickwork wall 85 open at one end and substantially closed at the other end by a wall 87 having a central cylindrical opening 88 which constitutes the inlet opening of the work chamber. This structure is lowered into a cylindrical vessel 89 through an open upper end of the latter so that the end wall 87 rests on horizontal support bars 90 extending across the vessel above the lower end thereof. Thus, the enclosure 84, which is substantially heavier than the enclosure 28 shown in FIGS. 1 and 2, is firmly supported in spaced relation with the walls of the vessel. A plurality of sets of brackets 91 and 92 angularly spaced around the upper end of the enclosure 84 and secured respectively to the vessel and the enclosure are bolted together at 93 to prevent tilting of the enclosure out of the upright position.

To provide a support for holding work baskets 94 in the work chamber, a plurality of vertical bars 95 are angularly spaced around the inside of the wall 85 inwardly of the inner surface thereof to form a generally cylindrical cage 97. Each bar is formed with a U-shaped inwardly extending radial bend 98 adjacent the end wall 87 so that the upper legs of the bends extend under and abut against the underside of the basket 94. The lower end of each bar is embedded in the end wall 87 and reinforcing rings 99 may be wrapped around the cage adjacent the upper and lower ends to prevent spreading apart of the bars when a basket is lowered into the cage. This furnace is evacuated through a port 96 and is heated by vertical radiant heating tubes 100 angularly spaced around the inner surface of the wall 85 between the latter and the cage, each tube being supported between upper and lower brackets 101 and 102. Adjacent the upper ends, the tubes 100 are connected to insulated lead-in tubes 103 extending out through the wall 85.

After a basket of workpieces has been lowered into the work chamber 83, the upper end of the chamber is closed by an inner cover 104 which forms the top wall of the enclosure. This cover is supported on or close to the annular end surface of the wall 85 and is formed with a central cylindrical opening 105 which constitutes the outlet of the chamber. Herein, the cover comprises a cup-shaped metal shell 107 opening toward the chamber and insulated to reduce heat conduction therethrough. Preferably, the insulation takes the form of a layer 108 of high temperature fire brick across the open end of the cup and a layer 109 of lighter and less expensive insulation such as alumina wool above the layer 108. The brickwork is held in the cover by an inturned flange 110 around the lip of the cup.

To close the upper open end of the vessel 89, a cup-shaped outer cover 111 having an external annular flange 112 thereon is lowered onto the vessel so that the flange 112 rests on a similar flange 113 encircling the upper end of the vessel. These two flanges are bolted together at 114 with an O ring 115 pressed in an annular groove around the flange 112 to seal the vessel against air leakage. Preferably, the inner cover is telescoped into and fastened to the outer cover by means of angularly spaced sets of brackets 117 and 118 on the respective covers bolted together at 119 so that both covers may be removed together. A sight tube 120 extending through the inner cover is alined with a glass-covered sight opening 121 in the outer cover to permit visual observation of the workpieces during heating.

The baffle members in this embodiment comprise discs 122 and 123 larger than and overlying the openings 88 and 105 in the outer chamber 124, the baffles being spaced outwardly from the upper and lower ends of the enclosure 84 and overlapping the enclosure walls around the openings. The lower baffle 122 may be supported adjacent the lower end of the enclosure below the bars 90 on a horizontal plate 125 resting on the lower end of the vessel, and preferably is of fire brick construction forming a flat surface 127 for blocking radiation through the opening. To deflect the cooled gas upwardly toward the inlet opening 88, the edges of the baffle may be beveled at 128. The upper baffle is supported above the cover 104 on upright posts 129 and is composed of suitable insulation such as alumina wool 130 supported in a shell formed by panels 131. The lower ends of the posts 129 are secured to the inner cover around the opening 105 as by welding and the upper ends may be welded to the panel around the peripheral edge of the baffle 123.

In this instance, the cooling gas is admitted through a conduit 136 and is circulated by a fan 132 of the squirrel-cage type in which the blades 133 are disposed radially outwardly from a shaft 134 journaled in the cover and driven by a motor 135. The blades are supported for rotation with the shaft by a dished disc 137 fast on the shaft and carrying the blades around its outer periphery. The lower edges of the blades may be connected by a ring 138. As shown in FIG. 3, the blade assembly is of larger inner diameter than the diameter of the upper baffle 123 and is telescoped over the latter so that the blades rotate in a path encircling the opening 105. Thus, heated gas is forced outwardly and away from the opening on all sides of the baffle and downwardly on all sides of the enclosure 84 to draw cooled gas into the inlet opening 88, around the workpieces, and then out through the outlet opening 105.

The means for cooling gas in the outer chamber 124 may include cold water circulated through a tube 139 coiled around the outside of the vessel thereby to cool the wall of the vessel 89 in contact with the gas circulating in the outer chamber 124. The invention also contemplates reducing the amount of heat stored in at least part of the walls of the enclosure 84 thereby to facilitate rapid cooling of both the work chamber 83 and the gas in the outer chamber and also enabling the use of less of the relatively expensive high temperature resistant material in the enclosure. For these purposes, means is provided for cooling the outer portions of the cylindrical wall 85 to remove heat conducted through this wall to the outer portion thereof. Consequently, the heating chamber may be cooled more quickly during quenching and no heat is radiated to the outer chamber 124 through the cylindrical wall. Thus, the temperature of the gas is reduced rapidly to a lower level than would be attainable if the outer portion of the enclosure were heated to a higher temperature. Moreover, the insulation is more efficient when maintained at lower temperatures and, for this reason, a thinner layer of insulation may be used.

In the present instance, the enclosure is cooled by means of cold water circulated through a cooling element comprising a tube 140 coiled around the outside of the wall 85 as shown in FIG. 3 so that the water conducts heat away from the enclosure. With the outer portion of the enclosure maintained at a lower temperature, this portion may comprise a layer 141 of less expensive material, such as cheaper brick or alumina wool, resistant to a second predetermined lower temperature. Herein, the outer layer 141 is composed of alumina wool held against the outer surface of the brick wall by a cylindrical sheet metal shell 142 and a sheet metal ring 143 across the lower end wall 87 of the enclosure and the cooling tube 140 is coiled around the cylindrical shell 142. Such cooling of the enclosure walls also could be applied to the furnace shown in FIGS. 1 and 2, if desired, to maintain the walls of the enclosure 28 at lower temperatures with advantages similar to those obtained in the high temperature furnace enclosure 84.

I claim as my invention:

1. In a heat treating furnace, the combination of, an air-tight hollow vessel, a walled enclosure supported within said vessel in spaced relation with the inner walls thereof and defining a substantially enclosed work chamber within said enclosure and an outer chamber between the enclosure and the vessel, selectively operable means for evacuating said vessel and said work chamber, a selectively operable radiant heater in said work chamber for heating a workpiece therein, the walls of said enclosure having panels on the inner surfaces thereof for reflecting radiation back toward the workpiece and also having a layer of insulating material on the outer sides of said panels to reduce heat conduction therethrough, said enclosure having spaced inlet and outlet openings communicating between said chambers, baffles overlying said openings to block radiation therethrough while defining indirect passages for a flow of gas between said chambers, selectively operable means for circulating gas through said vessel and inducing a flow of gas into said work chamber through said inlet opening, around the workpiece therein, into said outer chamber through said outlet opening, and then back into the work chamber through said inlet opening, and means for cooling the circulating gas as it passes through said outer chamber.

2. The combination defined in claim 1 in which said enclosure walls and said baffles comprise shells of heat-resistant metal filled with insulating material.

3. In a heat treating furnace, the combination of, an air-tight hollow vessel, a walled enclosure supported within said vessel in spaced relation with the inner walls thereof and defining a substantially enclosed work chamber within said enclosure and an outer chamber between the enclosure and the vessel, selectively operable means for evacuating said vessel and said work chamber, a selectively operable radiant heater in said work chamber for heating a workpiece therein, said enclosure having heat-resistant inner walls backed by insulating material for reducing heat conduction through the enclosure to said outer chamber during heating in a vacuum, and also being formed with spaced inlet and outlet openings communicating between said chambers, means for blocking radiation through said openings during such heating and defining indirect passages for a flow of gas between said chambers, selectively operable means for circulating gas through said vessel and inducing a flow of gas into said work chamber through said inlet opening, through the work chamber, into said outer chamber through said outlet opening, and then back into the work chamber through said inlet opening, and means for cooling the circulating gas in said outer chamber.

4. In a heat treating furnace, the combination of, an air-tight hollow vessel, a walled enclosure supported within said vessel in spaced relation with the inner walls thereof and defining a substantially enclosed work chamber within said enclosure and an outer chamber between the enclosure and the vessel, selectively operable means for evacuating said vessel and said work chamber, a selectively operable radiant heater in said work chamber for heating a workpiece therein, said enclosure having heat-resistant inner walls backed by insulating material for reducing heat conduction through the enclosure to said outer chamber during heating in a vacuum, and also being formed with spaced inlet and outlet openings communicating between said chambers, means for blocking radiation through said openings during such heating and defining indirect passages for a flow of gas between said chambers, selectively operable means for circulating gas through said vessel and inducing a flow of gas into said work chamber through said inlet opening, through the work chamber, into said outer chamber through said outlet opening, and then back into the work chamber through said inlet opening, and means for cooling the circulating gas in said outer chamber, including means operable in a vacuum to cool the outer side of said enclosure thereby to reduce the heat radiated to said vessel, reduce the heat stored in the enclosure, and facilitate the rapid cooling of the gas.

5. The combination defined in claim 4 in which said gas cooling means includes liquid circulating elements in intimate engagement with both the inner vessel walls and said outer enclosure sides.

6. The combination defined in claim 4 in which said enclosure walls comprise inner and outer layers composed of different types of insulation, the insulation of said inner layer being resistant to a first predetermined high temperature and the insulation of said second layer being resistant to a second temperature lower than said high temperature and maintained below said lower temperature by said means for cooling the outer sides of said enclosure.

7. In a vacuum heat treating furnace, the combination of, a hollow air-tight vessel, an enclosure having insulated walls disposed within said vessel and defining a work chamber, a support in said chamber for workpieces to be treated, a selectively operable radiant heater for heating the interior of haid chamber, said enclosure having an outlet opening of predetermined size in one wall thereof, a baffle larger than said opening spaced from and overlying the opening to check heat radiation from said chamber through the opening, said enclosure having an outlet opening of predetermined size in a second wall thereof, a second baffle larger than said outlet opening spaced from said second wall and overlying the outlet opening to check radiation therethrough, a fan including a plurality of radial blades arranged in an annular series generally in the plane of and encircling said second baffle, and means for driving said fan to force gas in said furnace outwardly away from said second baffle and cause the gas to flow into said chamber through said inlet opening and out through said outlet opening.

8. In a vaccum furnace, the combination of, a hollow air-tight vessel, an enclosure having insulated walls and supported within said vessel in spaced relation with the inner walls of the vessel, said enclosure defining a work chamber for the heat treatment of workpieces, means for heating workpieces in said work chamber, means for cooling said inner vessel walls, and additional cooling means contacting and cooling the outer sides of said enclosure.

9. In a heat treating furnace, the combination of, a walled enclosure defining a work chamber, a heater for heating workpieces in said chamber, the inner portion of the walls of said enclosure being composed of one material resistant to a first predetermined high temperature and the outer portion of said walls being composed of a different material resistant to a second predetermined temperature lower than said first temperature, and means for cooling said outer portion and maintaining the temperature level thereof below said second temperature during heating of workpieces in said chamber.

10. In a vacuum heat treating furnace, the combination of, an air-tight hollow vessel, a walled enclosure supported within said vessel and defining a work chamber inside said enclosure and a cooling chamber outside the enclosure, said enclosure being formed with spaced inlet and outlet ports communicating between said chambers, a selectively operable radiant heater in said work chamber, selectively operable means for evacuating said vessel, and selectively operable means for admitting gas into said vessel and circulating the gas successively through said work chamber, said outlet port, said cooling chamber, and said inlet port thereby to cool workpieces in the work chamber after heating by said heater, the walls of said enclosure comprising inner heat resistant surfaces for reflecting heat radiated by said heater backed by insulation outside said surfaces to reduce heat conduction through said walls into said cooling chamber.

References Cited by the Examiner

UNITED STATES PATENTS

| | | |
|---|---|---|
| 1,994,629 | 3/1935 | Arkema. |
| 2,228,088 | 1/1941 | Roth. |
| 2,254,047 | 8/1941 | Roth. |
| 2,258,431 | 10/1941 | Wellman. |
| 3,002,735 | 10/1961 | Baker et al. _____ 263—40 |
| 3,025,044 | 3/1962 | Giler _____ 263—40 |

WHITMORE A. WILTZ, *Primary Examiner.*

RAY K. WINDHAM, MORRIS O. WOLK, *Examiners.*